US011960224B2

(12) United States Patent
Shinagawa et al.

(10) Patent No.: US 11,960,224 B2
(45) Date of Patent: Apr. 16, 2024

(54) FIXING DEVICE

(71) Applicant: CANON KABUSHIKI KAISHA, Tokyo (JP)

(72) Inventors: Akiyoshi Shinagawa, Saitama (JP); Yasuharu Toratani, Chiba (JP); Hiroshi Miyamoto, Saitama (JP); Daigo Matsuura, Tokyo (JP); Hiroki Kawai, Chiba (JP); Ayano Ogata, Ibaraki (JP); Masanobu Tanaka, Chiba (JP); Asuna Fukamachi, Chiba (JP); Misa Kawashima, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/170,082

(22) Filed: Feb. 16, 2023

(65) Prior Publication Data

US 2023/0273550 A1 Aug. 31, 2023

(30) Foreign Application Priority Data

Feb. 28, 2022 (JP) ................................ 2022-028922
Feb. 28, 2022 (JP) ................................ 2022-028924

(51) Int. Cl.
*G03G 15/20* (2006.01)
*G03G 21/16* (2006.01)

(52) U.S. Cl.
CPC ..... *G03G 15/2028* (2013.01); *G03G 15/2017* (2013.01); *G03G 15/2053* (2013.01);
(Continued)

(58) Field of Classification Search
CPC ........... G03G 15/2028; G03G 15/2017; G03G 15/2053; G03G 15/2057; G03G 15/206;
(Continued)

(56) References Cited

U.S. PATENT DOCUMENTS 10,901,353 B2 1/2021 Tanaka et al.
11,156,948 B2 10/2021 Tanaka et al.
(Continued)

FOREIGN PATENT DOCUMENTS

JP 2020-52354 A 4/2020

OTHER PUBLICATIONS

U.S. Appl. No. 18/161,164, filed Jan. 30, 2023, Matsuura et al.
U.S. Appl. No. 18/166,651, filed Feb. 9, 2023, Kawai et al.

*Primary Examiner* — Joseph S Wong
(74) *Attorney, Agent, or Firm* — VENABLE LLP

(57) ABSTRACT

A fixing device includes an endless belt, a rotatable pressing member, a pad member inside of the belt, and a sliding member held by the pad member and sliding on an inner circumferential surface of the belt in a nip. The rotatable pressing member nips and feeds a recording material in the nip in cooperation with the belt and fixes a toner image on the recording material by applying heat and pressure. The sliding member includes a base material layer on which a plurality of projections projecting toward the rotatable pressing member are formed on a side sliding with the belt and a sliding layer provided on an outer surface of the plurality of projections. A leading end of the plurality of projections is a plane and an average roughness (Ra) of the plane satisfies 0.13 μm≤Ra≤1.67 μm.

10 Claims, 13 Drawing Sheets

(52) U.S. Cl.
CPC ....... *G03G 15/2057* (2013.01); *G03G 15/206* (2013.01); *G03G 15/2064* (2013.01); *G03G 21/1685* (2013.01); *G03G 2215/2003* (2013.01); *G03G 2215/2016* (2013.01); *G03G 2215/2019* (2013.01); *G03G 2215/2035* (2013.01); *G03G 2215/2048* (2013.01); *G03G 2215/2051* (2013.01); *G03G 2215/2054* (2013.01)

(58) Field of Classification Search
CPC ........... G03G 15/2064; G03G 21/1685; G03G 2215/2003; G03G 2215/2016; G03G 2215/2019; G03G 2215/2035; G03G 2215/2048; G03G 2215/2051; G03G 2215/2054
See application file for complete search history.

(56) References Cited

U.S. PATENT DOCUMENTS

| | | | | |
|---|---|---|---|---|
| 11,194,275 | B2 | 12/2021 | Takemasa et al. | |
| 11,300,906 | B2 | 4/2022 | Takemasa et al. | |
| 2012/0230742 | A1* | 9/2012 | Nakagawa | B32B 27/34 399/329 |
| 2017/0176905 | A1* | 6/2017 | Suzuki | G03G 15/2053 |
| 2020/0409292 | A1* | 12/2020 | Fujimoto | G03G 15/2025 |

* cited by examiner

| SAMPLE | SURFACE ROUGHNESS OF BASIC MATERIAL LAYER Ra | ADHESIVE STRENGTH | DAMAGE OF BELT | DRIVE TORQUE |
|---|---|---|---|---|
| SLIDING MEMBER A | 0.04 μm | MANY COAT PEELING | SLIGHT | × |
| SLIDING MEMBER B | 0.13 μm | MINUTE COAT PEELING | SLIGHT | ○ |
| SLIDING MEMBER C | 0.52 μm | MINUTE COAT PEELING | SLIGHT | ○ |
| SLIDING MEMBER D | 1.67 μm | MINUTE COAT PEELING | SLIGHT | ○ |
| SLIDING MEMBER E | 2.09 μm | MINUTE COAT PEELING | STRIPPED SCAR | × |

DRIVE TORQUE
○:MAINTAIN PREDETERMINED VALUE OF TORQUE OR LESS
×:STOP DUE TO EXCESS OF PREDETERMINED VALUE

Fig. 8

(a)
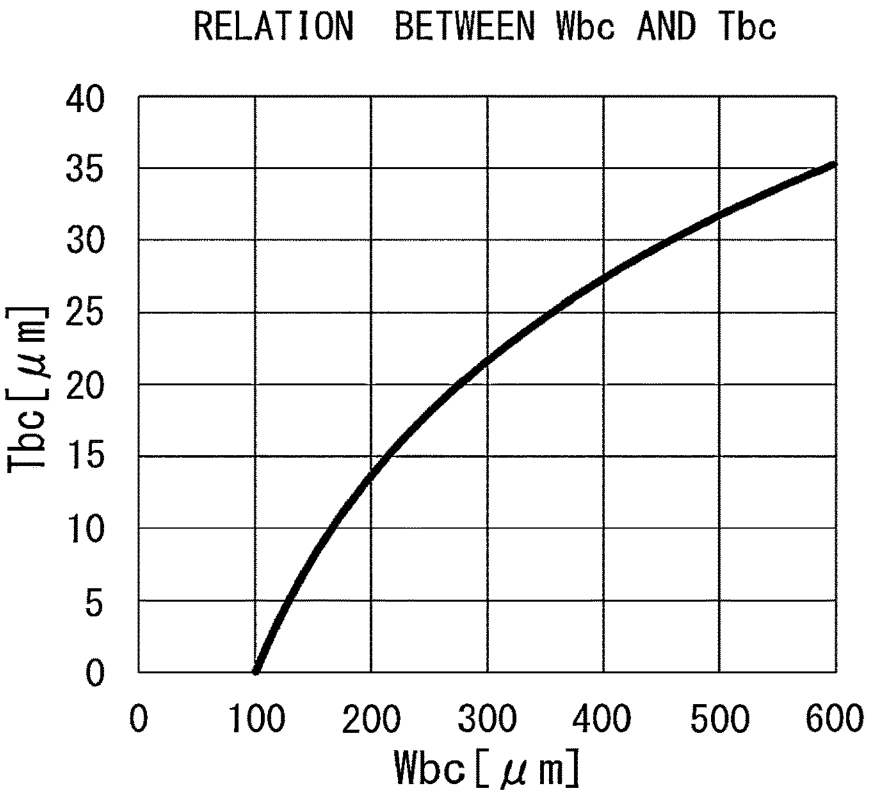
(b)
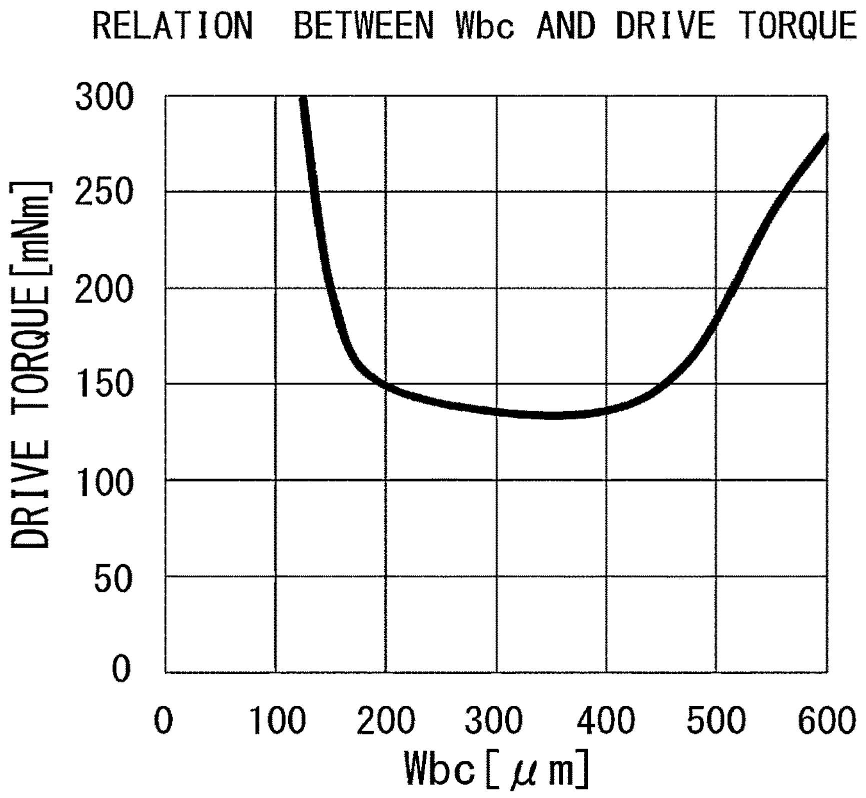
Fig. 12

| SAMPLE | d | Wbc | Tbc | INITIAL DRIVE TORQUE (LESS THAN 1h) | FINAL DRIVE TORQUE (240h) |
|---|---|---|---|---|---|
| SLIDING MEMBER A | 1.4mm | 100 μm | ≤ 1 μm | × | × |
| SLIDING MEMBER B | 1.4mm | 150 μm | 8 μm | ○ | × |
| SLIDING MEMBER C | 1.4mm | 200 μm | 13 μm | ○ | ○ |
| SLIDING MEMBER D | 1.4mm | 450 μm | 29 μm | ○ | ○ |
| SLIDING MEMBER E | 1.4mm | 500 μm | 32 μm | ○ | × |
| SLIDING MEMBER F | 1.4mm | 550 μm | 33 μm | × | × |
| SLIDING MEMBER G | 1.8mm | 500 μm | 32 μm | ○ | ○ |
| SLIDING MEMBER H | 1.8mm | 550 μm | 33 μm | ○ | ○ |

DRIVE TORQUE
○:PREDETERMINED VALUE OF TORQUE OR LESS
×:STOP DUE TO EXCESS OF PREDETERMINED VALUE

Fig. 13

FIXING DEVICE

FIELD OF THE INVENTION AND RELATED ART

The present invention relates to a fixing device which fixes a toner image which is borne on a recording material to the recording material.

As a fixing device, a configuration in which a nip portion which nips and feed a recording material by a nip forming member such as a belt and a roller is formed and the recording material which passes through the nip portion is heated and pressed has been known. Further, in the configuration, the nip portion is formed between the belt and the nip forming member by sliding a sliding member on an inner peripheral surface of the belt in the nip portion.

In order to ensure quality of an image which is fixed on the recording material, it is required for the fixing device to suppress slip between the recording material which is fed in the nip portion and the belt, and slip between the recording material and the nip portion forming member. Therefore, a frictional force between the belt and the sliding member is required to be smaller than a frictional force between the recording material and the belt and a frictional force between the recording material and the nip portion forming member. In particular, in a configuration which includes a wide nip in which the nip portion is made to be wider to increase heating efficiency, it is required that the frictional force between the belt and the sliding member is reduced.

For example, in Japanese Laid-Open Patent Application (JP-A) 2020-52354, a configuration, in which concaves and convexes are formed on a sliding sheet which slides with an inner peripheral surface of the belt in the nip portion in order to reduce a frictional force between the sliding sheet and the belt, is disclosed.

Here, in a configuration in which the concaves and the convexes are formed on the sliding member to reduce the frictional force between the sliding member and the inner peripheral surface of the belt, there is a case that a sliding layer is provided on a surface of a base material layer to reduce a coefficient of friction. In this case, it is required that adhesive strength between a base material layer and a sliding layer is appropriate. One of factors which are related to the adhesion strength is surface roughness of the base material layer. In a case that a surface of the base material layer is smooth, the adhesive strength is decreased. On the other hand, in a case that the surface roughness of the base layer is large, when the sliding layer wears down and exposes the base material layer, an inner peripheral surface of the belt may be easily damaged and a lifetime of the belt may be reduced. Further, when abrasive powder of the belt may stay in the sliding portion, an image defect may easily occur and the driving torque of the belt may increase.

An object of the present invention is to provide a configuration in which it is possible to prevent damage to the inner peripheral surface of the belt in a case that the base material layer is exposed, while ensuring adhesive strength between the base material layer and the sliding layer of the sliding member.

SUMMARY OF THE INVENTION

According to an aspect of the present invention, there is provided a fixing device, which fixes a toner image which are borne on a recording material to the recording material, is provided with an endless rotatable belt, a nip portion forming member which forms a nip portion which nips and feeds the recording material with the belt which is described above abutting against an outer peripheral surface of the belt, a sliding member which slides on an inner peripheral surface of the belt above in the nip portion which is described above, and a backup member which is arranged so as to nip the sliding member and the belt between the nip portion forming member and backs up the sliding member inside the belt, and the sliding member includes a base material layer in which a plurality of protrusions which protrudes toward the inner peripheral surface of the belt on a side which slides on the belt and a sliding layer which is provided to cover a surface of the side that slides on the belt of the base material layer, wherein an average roughness (Ra) of a leading end surface of the plurality of projections satisfies $0.13\ \mu m \leq Ra \leq 1.67\ \mu m$.

Further features of the present invention will become apparent from the following description of exemplary embodiments with reference to the attached drawings.

Figure 2:
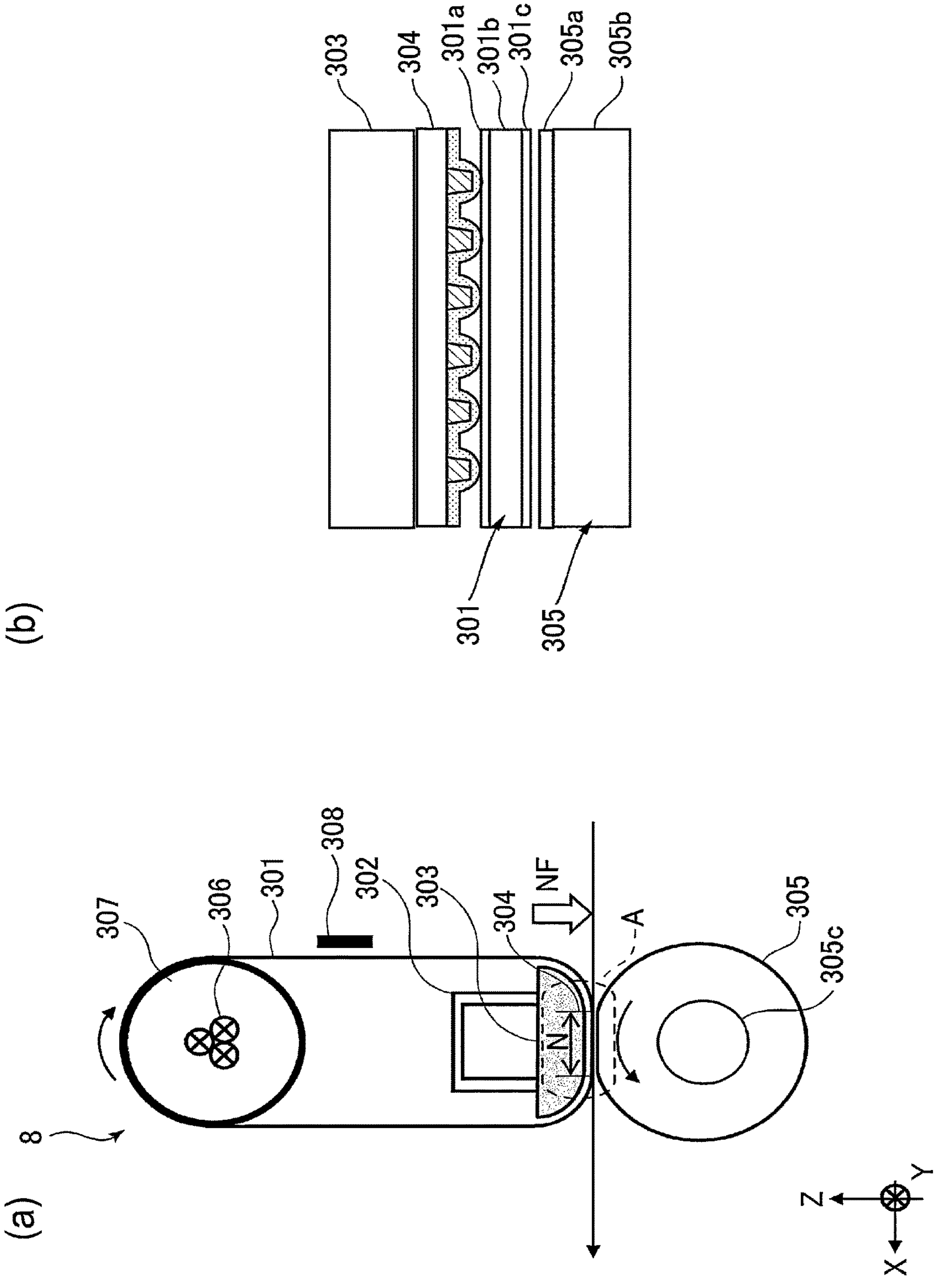

Part (a) of FIG. 2 is a schematic configuration sectional view of a fixing device according to the embodiment of the present invention, and part (b) of FIG. 2 is a schematic diagram in which a portion A in part (a) of FIG. 2 is enlarged.

Figure 3:
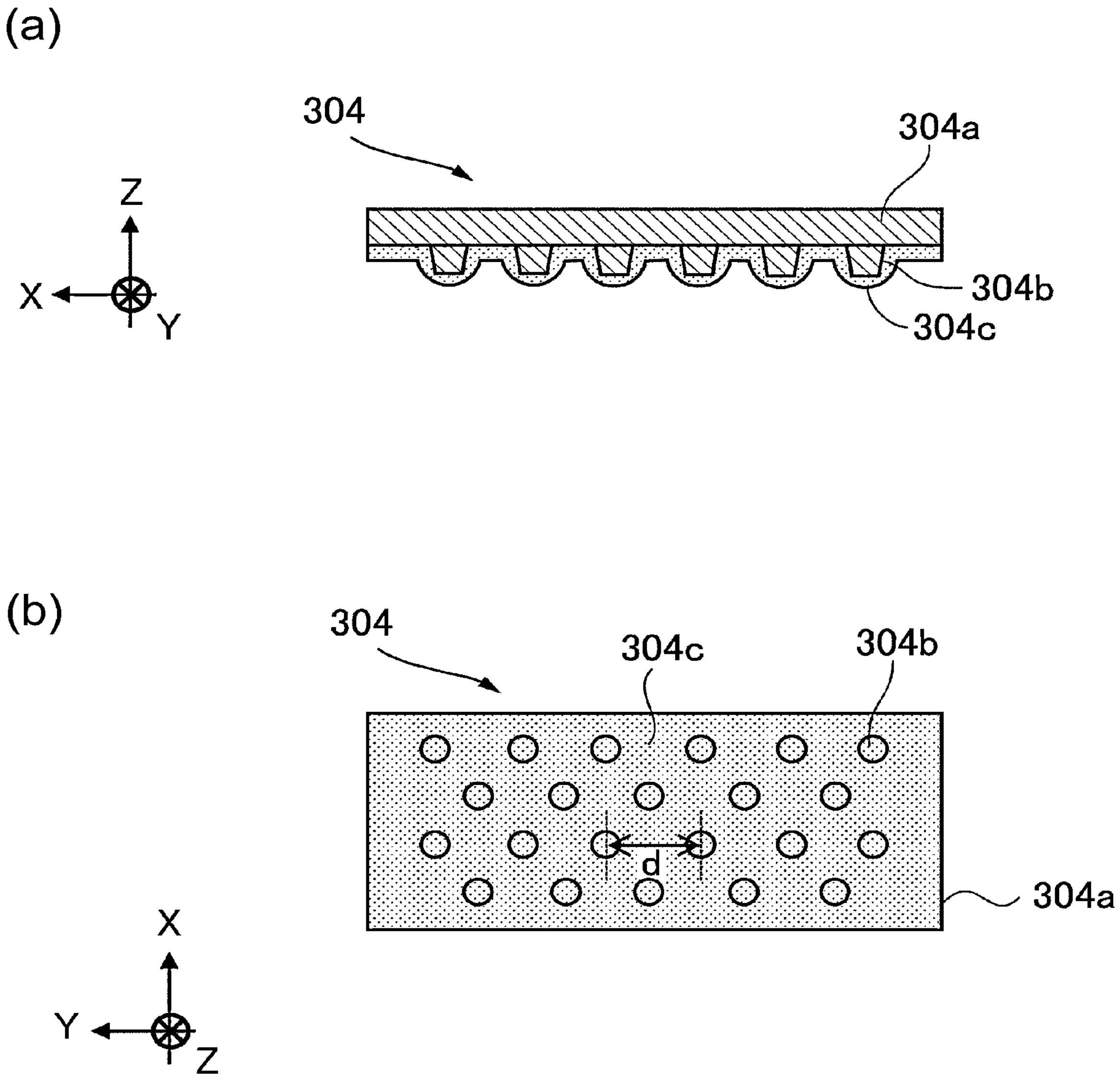

Part (a) of FIG. 3 is a sectional view and part (b) of FIG. 3 is a plan view, showing a sliding member according to the embodiment of the present invention.

Figure 4:
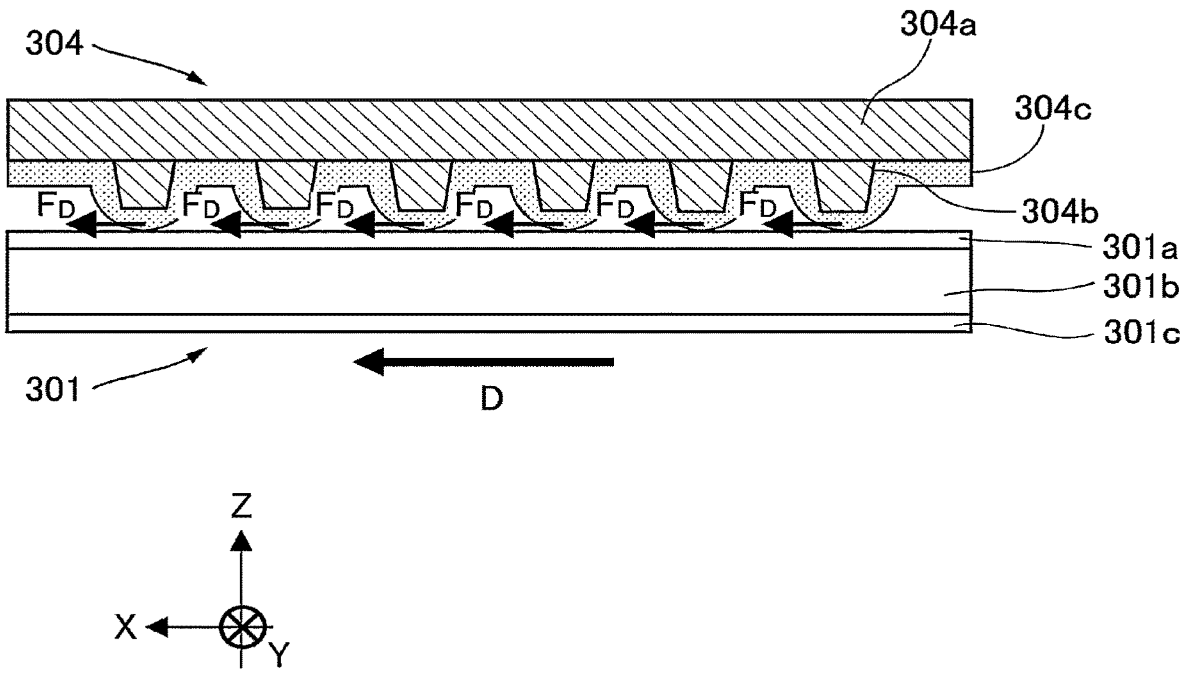

FIG. 4 is a sectional view schematically showing a relationship between the sliding member and the belt according to the embodiment of the present invention.

Figure 5:
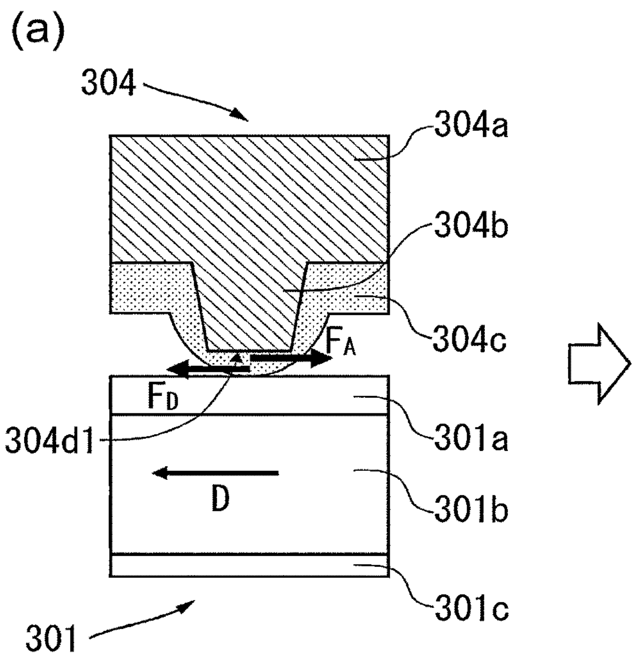

Part (a) and part (b) of FIG. 5 are schematic sectional views showing a relationship between a protrusion of the sliding member and the belt according to a comparative example 1 of the present invention, in which part (a) of FIG. 5 is the view showing a relationship of force which is generated in a sliding layer of the protrusion and part (b) of FIG. 5 is the view showing a state that the sliding layer is peeled off from a base material layer, respectively.

Figure 6:
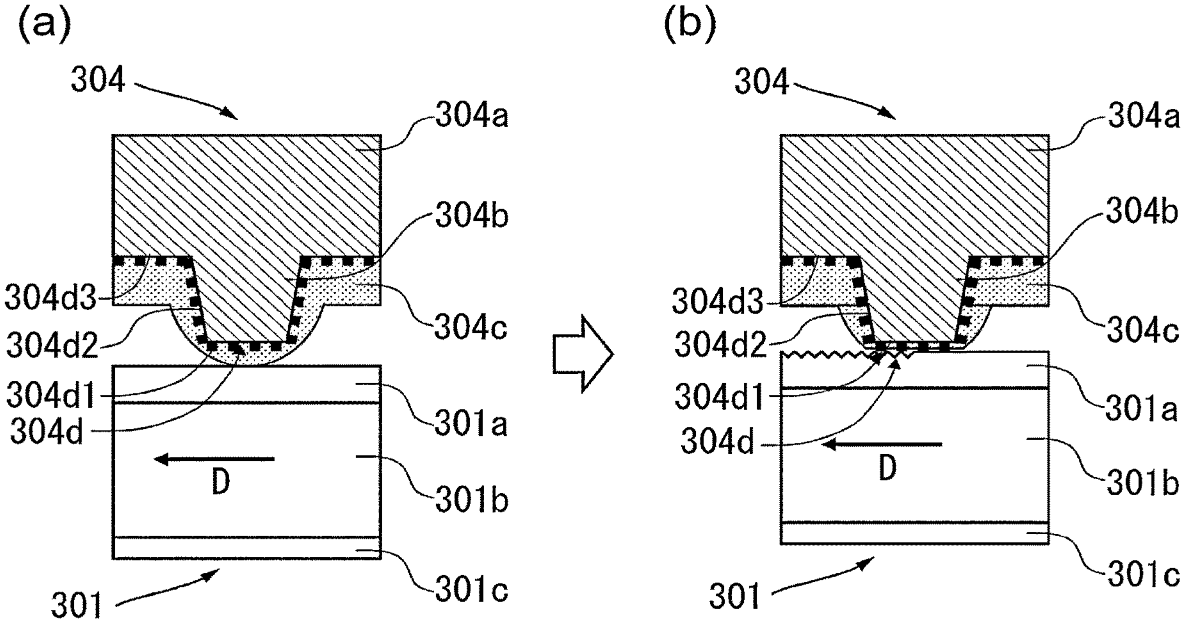

Part (a) and part (b) of FIG. 6 are schematic sectional views showing a relationship between a protrusion of the sliding member and the belt according to a comparative example 2 of the present invention, in which part (a) of FIG. 6 is the view showing a state that a sliding layer of the protrusion exists and part (b) of FIG. 6 is the view showing a state that the sliding layer is exposed, respectively.

Figure 7:
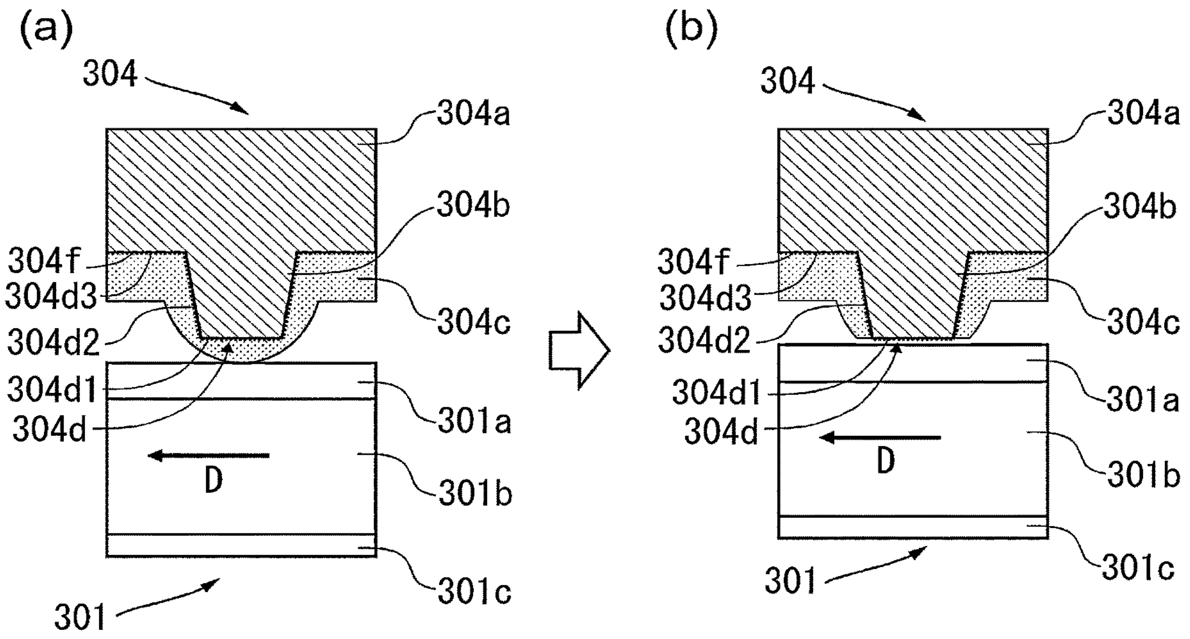

Part (a) and part (b) of FIG. 7 are schematic sectional views showing a relationship between the protrusion of the sliding member and the belt according to the embodiment of the present invention, in which part (a) of FIG. 7 is the view showing a state that the sliding layer of the protrusion exists and part (b) of FIG. 7 is the view showing a state that the sliding layer is exposed, respectively.

FIG. 8 is a table showing results of experiments which are conducted to confirm an effectiveness of the embodiment.

Figure 9:
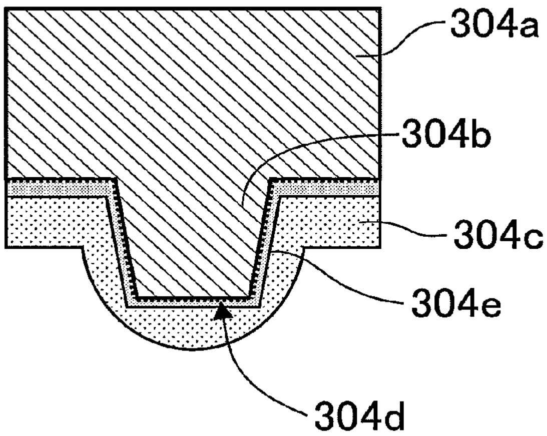

FIG. 9 is a sectional view schematically showing the protrusion of the sliding member according to another example of the embodiment.

Figure 10:
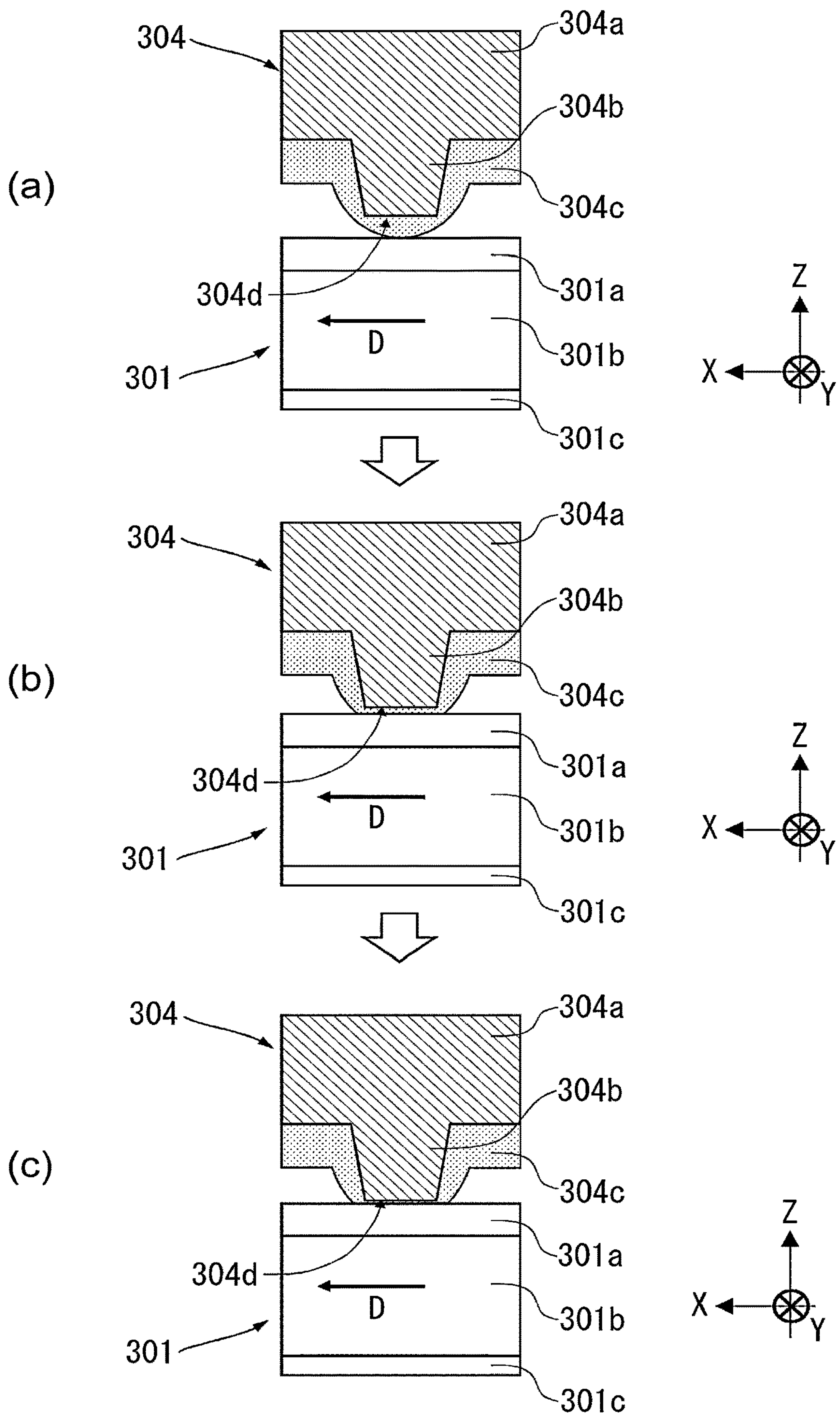

Part (a), part (b) and part (c) of FIG. 10 are sectional views schematically showing a relationship between the protrusion of the sliding member and the belt, and part (a) of FIG. 10 is the view showing a state that film thickness of the sliding layer of the protrusion is large, part (b) of FIG. 10 is the view showing a state that the film thickness is decreased and part (c) of FIG. 10 is the view showing a state that a leading end surface of the protrusion is exposed, respectively.

Figure 11:
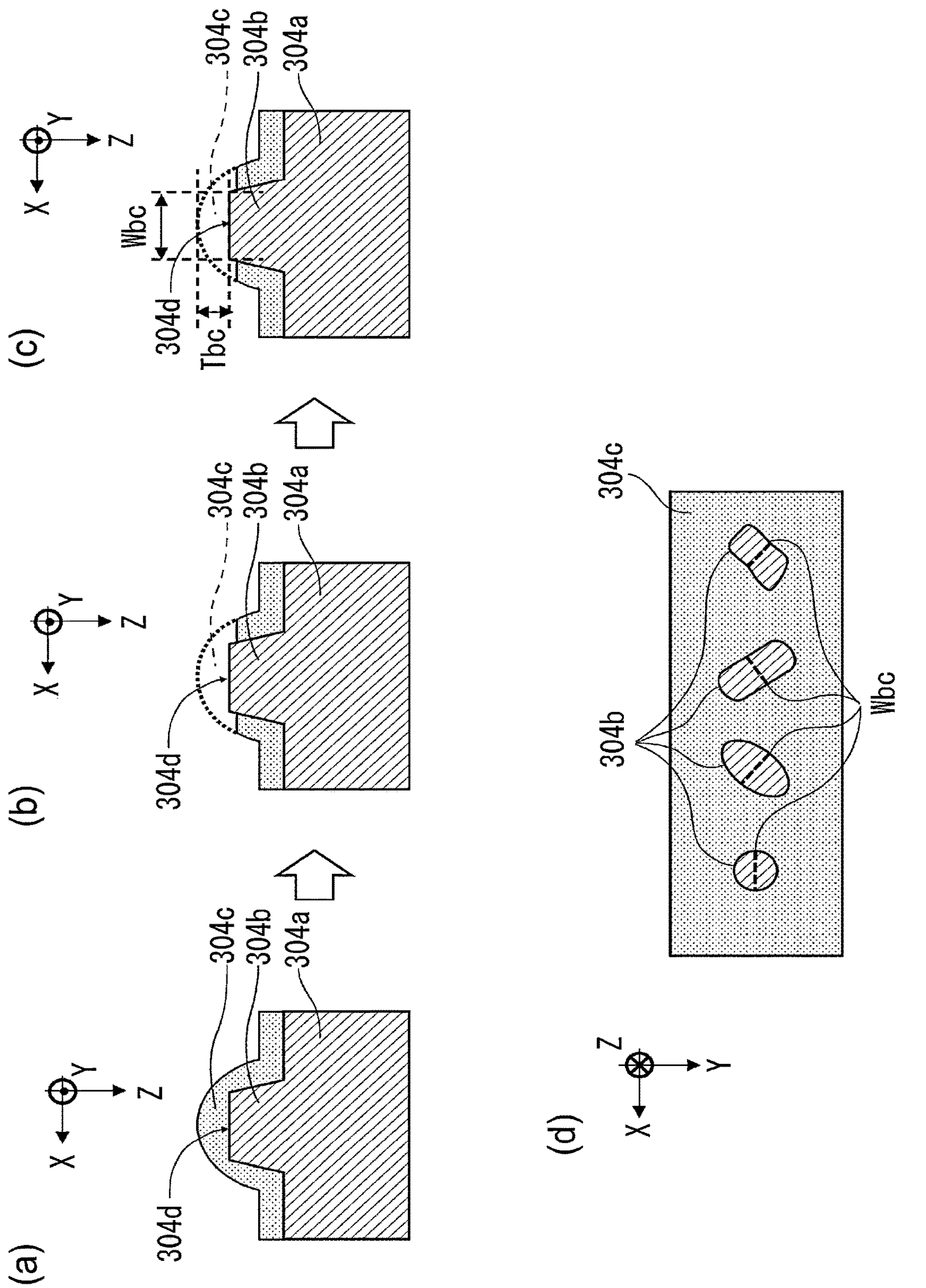

Part (a), part (b), part (c) and part (d) of FIG. 11 are sectional views schematically showing the enlarged protrusion of the sliding member according to the embodiment, and part (a) of FIG. 11 is the view showing a state that the sliding layer exists on the protrusion, part (b) of FIG. 11 is the view showing a state that the sliding layer at the leading end of the protrusion is removed, part (c) of FIG. 11 is the view to define thickness of the sliding layer and part (d) of FIG. 11 is the view to define a shape of the leading surface of the protrusion.

Part (a) of FIG. 12 is a graph showing a relationship between the thickness of the sliding layer and width of the leading end surface of the protrusion, and part (b) of FIG. 12 is a graph showing a relationship between the width of the leading end surface of the protrusion and driving torque.

FIG. 13 is a table showing results of experiments which are conducted to confirm the effectiveness of the embodiment.

DESCRIPTION OF THE EMBODIMENTS

The embodiments will be described by using from FIG. 1 through FIG. 8.

Figure 1:
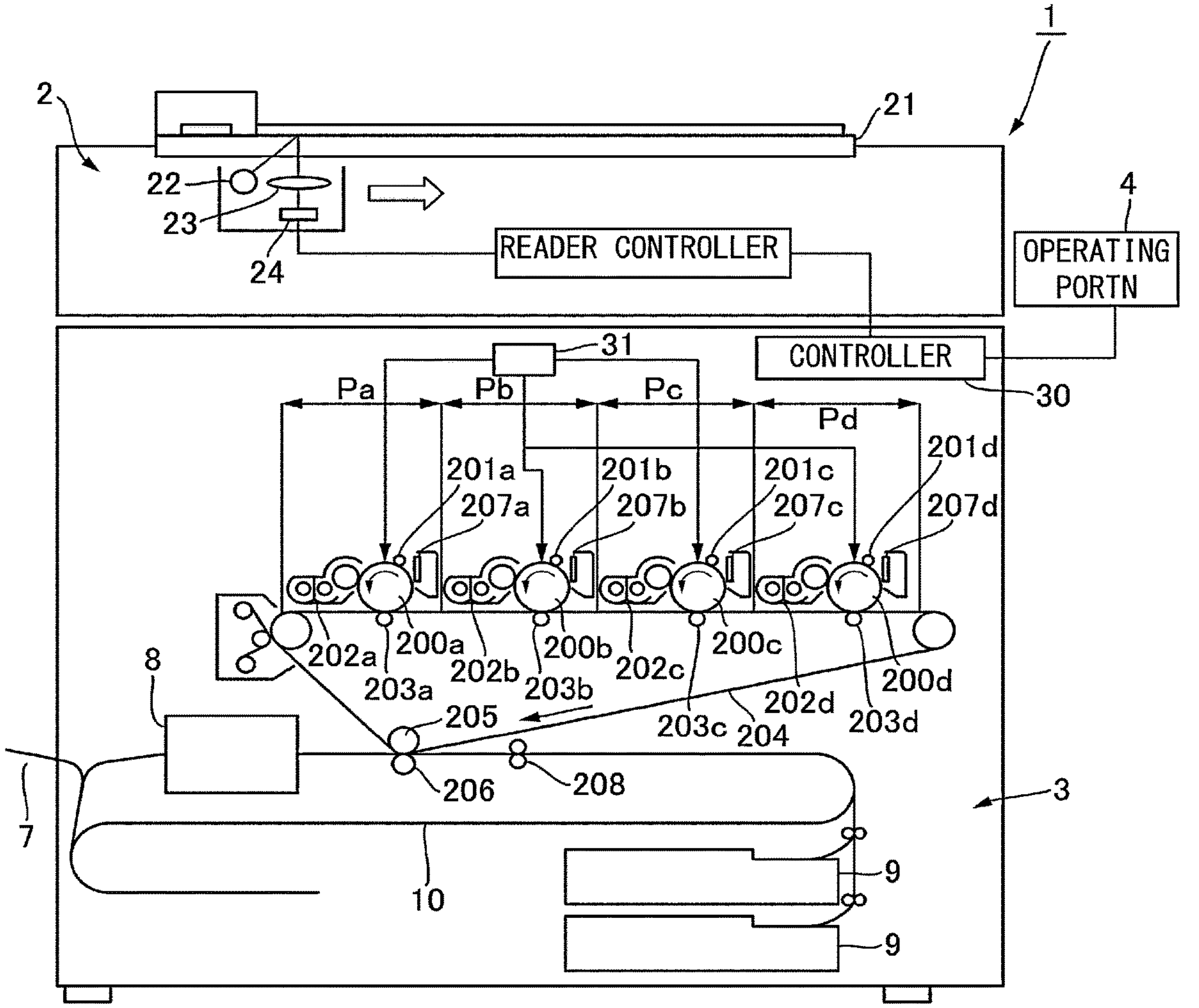
FIG. 1 is a schematic configuration sectional view of an image forming apparatus according to an embodiment of the present invention.

First of all, a schematic configuration of an image forming apparatus according to the embodiment will be described by using FIG. 1.

[Image Forming Apparatus]

An image forming apparatus 1 is a full color printer of an electrophotographic type which includes four image forming portions Pa, Pb, Pc and Pd, which are provided corresponding to each of four colors which are yellow, magenta, cyan and black. In the embodiment, a tandem type is applied in which the image forming portions Pa, Pb, Pc and Pd are arranged along a rotational direction of an intermediary transfer belt 204 which will be described below. The image forming apparatus 1 forms a toner image (image) on a recording material according to an image signal from an image reading portion (document reading device) 2 which is connected to an image forming apparatus main assembly 3 or a host device such as a personal computer which is communicably connected to the image forming apparatus main assembly 3. The recording material includes sheet material such as paper, plastic film and cloth.

The image forming apparatus 1 is provided with the image reading portion 2 and the image forming apparatus main assembly 3. In the image reading portion 2 which reads a document which is placed on a document table glass 21, light which is emitted from a light source 22 is reflected by the document and forms an image on a CCD sensor 24 through an optical system member 23 such as a lens. By scanning in a direction of an arrow, such an optical system unit converts the document into an electrical signal data column for each line. An image signal which is obtained by the CCD sensor 24 is sent to the image forming apparatus main assembly 3, and image processing is performed according to each image forming portion, which will be described below, in a control portion 30. Further, the control portion 30 receives external input from an external host device, such as a print server, as an image signal.

The image forming apparatus main assembly 3 is provided with the plurality of image forming portions Pa, Pb, Pc and Pd, and each of the image forming portions performs image forming based on the image signal which is described above. That is, the image signal is converted into a laser beam which is PWM (Pulse Width Modulation) controlled by the control portion 30. A polygon scanner 31 as an exposure device scans the laser beam according to the image signal. And the laser beam is emitted to photosensitive drums from 200*a* through 200*d* as image bearing members in each of the image forming portions from Pa through Pd.

Incidentally, Pa is the image forming portion for yellow color (Y), Pb is the image forming portion for magenta color (M), Pc is the image forming portion for cyan color (C) and Pd is the image forming portion for black (Bk), which form images of the corresponding colors. Since the image forming portions from Pa through Pd are substantially same, details of the image forming portion Pa of Y will be described below, and descriptions of the other image forming portions will be omitted. In the image forming portion Pa, the photosensitive drum 200*a* forms a toner image on a surface of the photosensitive drum 200*a* based on the image signal as will be described below.

A charging roller 201*a* as a primary charging device charges a surface of the photosensitive drum 200*a* to a predetermined potential and prepares for forming an electrostatic latent image. The laser beam which is emitted from the polygon scanner 31 forms the electrostatic latent image on the surface of the photosensitive drum 200*a* which is charged to the predetermined potential. The developing device 202*a* develops the electrostatic latent image on the photosensitive drum 200*a* and forms a toner image. The primary transfer roller 203*a* applies a primary transfer bias of opposite polarity to the toner by discharging from a back of the intermediary transfer belt 204 and transfers the toner image on the photosensitive drum 200*a* onto the intermediary transfer belt 204. After transferring, the surface of the photosensitive drum 200*a* is cleaned by a cleaner 207*a*.

Further, the toner image on the intermediary transfer belt 204 is conveyed to the next image forming portion, the toner image of each color which formed in the respective image forming portion is sequentially transferred in an order of Y, M, C and Bk, and four color images are formed on the surface of the intermediary transfer belt 204. And the toner image which is passed through the image forming portion Pd, which is Bk and the most downstream of the intermediary transfer belt 204 with respect to a rotational direction, is conveyed to a secondary transfer portion which is configured of a secondary transfer roller pair 205 and 206. And in the secondary transfer portion, when a secondary transfer electric field of opposite polarity to the toner image on the intermediary transfer belt 204 is applied, the toner image is secondary transferred to the recording material.

The recording material is accommodated in a cassette 9, the recording material which is fed from the cassette 9 is conveyed to a registration portion 208 which is configured of a pair of registration rollers, for example, and waits at the registration portion 208. After that, the registration portion 208 conveys the recording material to the secondary transfer portion when a timing is controlled in order to align the paper with the toner image on the intermediary transfer belt 204.

The recording material in which the toner image is transferred in the secondary transfer portion is conveyed to the fixing device 8, and the toner image which is borne on the recording material is fixed to the recording material when the recording material is heated and pressed in the fixing device 8. The recording material, which is passed through the fixing device 8, is discharged to a discharging tray 7. Incidentally, in a case that image forming is performed on both sides of the recording material, when transferring and fixing of the toner image on a first side (front side) of the recording material is completed, the front and the back of the recording material are reversed through a reverse conveying portion 10, the toner image is transferred and fixed on a second side (back side) of the recording material, and the recording material is stacked on the discharging tray 7.

Incidentally, the control portion 30 controls the whole of the image forming apparatus 1 as described above. Further, the control portion 30 is possible to make various settings, etc., based on an input from the control portion 4 in which the image forming apparatus 1 includes. The control portion 30 includes a CPU (Central Processing Unit), ROM (Read Only Memory) and RAM (Random Access Memory).

The CPU controls each portion while reading a program which corresponds to a control procedure which is stored in the ROM. Further, the RAM stores working data and input data, and the CPU performs control by referring to the data which are stored in the RAM based on the program which is described above, etc.

[Fixing Device]

Next, a configuration of the fixing device 8 in the embodiment will be described by using part (a) and part (b) of FIG. 2. In the embodiment, the fixing device with a belt heating method, to which an endless belt is applied, is used. In part (a) of FIG. 2, an X direction indicates a conveying direction of the recording material P (not shown in the figure), a Y direction indicates a widthwise direction of the recording material which intersects (perpendicular in the embodiment) the conveying direction of the recording material, and a Z direction indicates a pressing direction which is a direction in which the recording material is pressed at a nip portion N. In the embodiment, the X direction, the Y direction and the Z direction are each perpendicular to each other.

The fixing device 8 includes a fixing belt (hereinafter referred to as "belt") 301, a stay 302, a pressing pad (hereinafter referred to as "pad") 303, a sliding member 304, a pressing roller 305, a heating roller 307, a thermistor 308, etc. The belt 301 is a heating rotatable member which is endless and rotatable. The pressing roller 305 as a nip portion forming member is a pressing rotatable roller which abuts against an outer peripheral surface of the belt 301 and forms a nip portion N which nips and conveys the recording material between the pressing roller 305 and the belt 301.

The sliding member 304 slides against an inner peripheral surface of the belt 301 in the nip portion N. The pad 303 as a backup member is arranged so as to nip the sliding member 304 and the belt 301 between the pad 303 and the pressing roller 305 inside the belt 301 and backs up the sliding member 304. The sliding member 304 is arranged so as to cover an outer peripheral surface of the pad 303 in a side of the belt 301. The stay 302 is arranged on an opposite side of the nip portion N across the pad 303 inside the belt 301, and supports the pad 303. The heating roller 307 is arranged so as to stretch the belt 301 inside the belt 301 and heats the belt 301. The thermistor 308 as a temperature sensing member detects temperature of the belt 301. Each configuration will be described in detail below.

The belt 301 includes thermal conductivity and heat resistance, etc., and is thin and cylindrical. In the embodiment, the belt 301 is configured of a three layer structure which forms a base layer 301*a*, an elastic layer 301*b* on an outer periphery of the base layer 301*a*, and a mold release layer 301*c* on an outer periphery of the elastic layer 301*b*, as shown in part (b) of FIG. 2. The base layer 301*a*, for example, is 80 μm thick and made of polyimide resin (PI). The elastic layer 301*b*, for example, is 300 μm thick and made of silicone rubber. The mold release layer 301*c*, for example, is 30 μm thick and made of PFA (tetrafluoroethylene/perfluoroalkoxyethylene copolymer resin) as a fluorocarbon resin. The belt 301 is stretched by the pad 303 and the heating roller 307. An outer diameter of the belt 301 is 150 mm in the embodiment.

The pad 303 is arranged so as to oppose the pressing roller 305 across the belt 301 inside the belt 301, while the nip portion N which nips and conveys the recording material between the belt 301 and the pressing roller 305 is formed. In the embodiment, the pad 303 is a substantially plate shaped member which is long with respect to a widthwise direction of the belt 301 (longitudinal direction which intersects a rotational direction of the belt 301 and a direction of a rotational axis of the heating roller 307). When the pad 303 is pressed against the pressing roller 305 across the belt 301, the nip portion N is formed. LCP (liquid crystal polymer) resin is used for a material of the pad 303. A sliding member 304 is interposed between the pad 303 and the belt 301. Details of the sliding member 304 will be described below.

The pad 303 is supported by the stay 302 as a support member which is arranged inside the belt 301. That is, the stay 302 is arranged on the opposite side of the pad 303 from the pressing roller 305 and supports the pad 303. The stay 302, which is a reinforcing member which has high rigidity with respect to the longitudinal direction of the belt 301, abuts against the pad 303 and backs up the pad 303. That is, the stay 302 gives strength to the pad 303 and secures a pressing force in the nip portion N, when the pad 303 is pressed from the pressing roller 305.

The stay 302 is made of metal such as stainless steel, and a cross section (transverse section), which is perpendicular to a longitudinal direction of the stay 302 which intersects a rotational direction of the belt 301, is substantially rectangular shape. For example, the stay 302 is made of drawn SUS304 (stainless steel) with a wall thickness of 3 mm and its strength is secured by forming the transverse section into a hollow whose shape is substantially square. Incidentally, the cross section of the stay 302 may be formed in a substantially rectangular shape by combining plurality of sheet metal, securing them to each other by welding, etc. Further, material of the stay 302 is not limited to stainless steel as long as its strength may be secured.

The heating roller 307 is arranged inside the belt 301 and stretches the belt 301 in addition to the pad 303. The heating roller 307 is formed in a cylindrical shape by metal such as aluminum or stainless steel, and a halogen heater 306 as a heating source for heating the belt 301 is arranged inside the heating roller 307. And the heating roller 307 is heated to a predetermined temperature by the halogen heater 306.

The heating roller 307 is also a steering roller which has a rotational center at one end or near a center with respect to the longitudinal direction and controls a position of the belt 301 with respect to a main scanning direction by generating a tension difference back and forth by rotating it against the belt 301. Further, the heating roller 307 is also a tension roller which is urged by a spring which is supported by an unshown frame and applies a predetermined tensile force to the belt 301.

In the embodiment, the heating roller 307 is formed by a pipe which is made of stainless steel and is 1 mm thickness, for example. Further, one halogen heater 306 may be enough, however, it is preferable to include the plurality of halogen heaters 306, considering temperature distribution control in a longitudinal direction (direction of rotational axis) of the heating roller 307. The plurality of halogen heaters 306 have light distributions which differ from each other in the longitudinal direction, and lighting ratio is controlled according to size of the recording material. In the embodiment, three halogen heaters 306 are arranged. Incidentally, the heating source is not limited to halogen heaters, however, it may be other heaters which is possible to heat the heating roller 307, for example, carbon heaters, etc.

The belt 301 is heated by the heating roller 307 which is heated by the halogen heater 306 and is controlled to a predetermined target temperature according to a type of the recording material based on temperature detection by the thermistor 308. The thermistor 308 is arranged opposing the outer peripheral surface of the belt 301 near a center in which all sizes of the recording materials, which are possible to be fixed in the fixing device 8 with respect to the widthwise direction of the belt 301, pass through. And the thermistor 308 detects the temperature of the belt 301, and the control portion controls electric power which is supplied to the halogen heater 306 so that the temperature which is detected by the thermistor 308 becomes the target temperature. Incidentally, the thermistor 308 may be a non-contact sensor which is arranged in close proximity to the outer peripheral surface of the belt 301 or a contact sensor which is arranged in contact with the outer peripheral surface of the belt 301.

The pressing roller 305 is also a driving rotatable member which rotates while abutting against the outer peripheral surface of the belt 301 and imparts driving force to the belt 301. Incidentally, in the embodiment, the heating roller 307 is also rotatably driven by a driving source (for example, a driving motor) and imparts driving force to the belt 301. However, imparting driving force to the heating roller 307 may be omitted. The pressing roller 305 is a roller which forms a core metal (shaft) 305*c*, an elastic layer 305*b* on an outer periphery of the core metal 305*c*, and a mold release layer 305*a* on its outer periphery of the elastic layer 305*b*. The core metal 305*c* is made of stainless steel with a diameter of 72 mm, for example. The elastic layer 305*b* is made of conductive silicone rubber with thickness of 8 mm, for example. The mold release layer 305*a*, for example, is 100 μm thick and made of PFA (tetrafluoroethylene/perfluoroalkoxyethylene copolymer resin) as a fluorocarbon resin. The pressing roller 305 is rotatably supported by a frame (not shown) of the fixing device 8, a gear is fixed at one end of the pressing roller 305, and the pressing roller 305 is connected to a driving source (for example, driving motor, not shown) via the gear and is rotationally driven.

The fixing device 8 heats the toner image in the nip portion N which is formed between the belt 301 and the pressing roller 305, while the fixing device 8 nips and conveys the recording material P which bears the toner image. In this way, the fixing device 8 fixes the toner image on the recording material P, while the fixing device 8 nips and conveys the recording material P. Thus, it is necessary to achieve both function of applying heat and pressure and function of conveying the recording material P. By a driving source which is unshown, the pressing roller 305 is pressed against the sliding member 304 via the belt 301. In the embodiment, it is set so that pressing force (NF) in the nip portion N during image forming, that is, a load value which is applied to the pad 303 and the pressing roller 305 is 1600 N, width of the nip portion N in the X direction (with respect to the conveying direction of the recording material) is 24.5 mm and width in the Y direction (with respect to the widthwise direction of the recording material) is 326 mm.

[Sliding Member]

A detailed configuration of the sliding member 304 is shown in part (a) and part (b) of FIG. 3. Part (a) of FIG. 3 is a sectional view of the sliding member 304 when it is cut in the conveying direction, and part (b) of FIG. 3 is a plan view of the sliding member 304 when it is viewed from a contacting surface side of the belt 301 with the sliding member 304. The sliding member 304 is fixed to the stay 302 by screws, etc. via the pad 303. Incidentally, the sliding member 304 may be integrated with the pad 303. Further, the sliding member 304 may be partially fixed to the stay 302 or the pad 303. For example, both ends of the sliding member 304 in the Y direction (widthwise direction) may be fixed to the pad 303 with screws, etc.

The sliding member 304 is configured of a base material layer 304*a* and a sliding layer 304*c*. On a side of the base material layer 304*a* which slides on the belt 301, a plurality of protrusions (embossed portions) 304*b* are formed which protrude toward the inner peripheral surface of the belt 301. The sliding layer 304*c* is provided so as to cover a surface of the side of the base material layer 304*a* (including the plurality of protrusions 304*b*) which slides on the belt 301.

The base material layer 304*a* may have sufficient strength and heat resistance. Stainless steel, copper, aluminum, engineering plastics (PI (polyimide), PEEK (polyether ether ketone), LCP (liquid crystal polymer), etc.), etc., are preferable for material of the base material layer 304*a*. In the embodiment, PI whose thickness is 300 μm is used as the base material layer 304*a*.

The plurality of protrusions 304*b* are formed integrally of same material as the base material layer 304*a*, and each of the protrusions 304*b* is arranged in plurality with respect to the conveying direction (X direction) of the recording material and with respect to the width direction (Y direction) of the recording material which intersects the conveying direction in the nip portion N. The plurality of protrusions 304*b* are provided so that total area of leading end surfaces of all of the plurality of protrusions 304*b* is 90% or more of total area of surface on a side of the sliding member 304 which slides on the inner peripheral surface of the belt 301.

Each of a distance (interval) d between centers of adjacent protrusions 304*b* with respect to the conveying direction and a distance (interval) d between centers of adjacent protrusions 304*b* with respect to the width direction is 1.25 mm or more, preferably 1.4 mm or more. In the embodiment, the intervals of the plurality of protrusions 304*b* are same with respect to the conveying direction and with respect to the width direction, in order to ensure uniform sliding properties with the belt 301, and the respective interval d is 1.4 mm. However, in a case that pressure distributions are different between the width direction and the conveying direction, the intervals of the protrusions in each direction may be changed according to the pressure distributions.

By providing the plurality of protrusions 304*b* on the side of the sliding member 304 which slides on the belt 301, contact area between the sliding member 304 and the belt 301 is reduced and, thereby, sliding resistance between the sliding member 304 and the belt 301 is reduced.

It is preferable that the sliding layer 304*c* is coating agent such as fluorocarbon resin (PTFE (Poly Tetra Fluoro Ethylene), PFA, etc.) for achieving low friction. In the embodiment, the sliding member 304 is formed by coating PTFE of 20 μm thickness on a surface of the base material layer 304*a* which includes the plurality of protrusions 304*b*. Further, in the embodiment, lubricant is applied to an inner surface of the belt 301. As a result, the belt 301 is configured to slide smoothly on the sliding member 304. Silicone oil is used as lubricant.

Further, the sliding member 304 according to the embodiment is configured so to cover the pad 303 both inside and outside the nip portion N. That is, except for a surface of the pad 303 on an opposite side of the nip portion N, an entire surface of the pad 303 which opposes the belt 301 is covered by the sliding member 304. Incidentally, the sliding member 304 may be arranged only in the nip portion N of the surface of the pad 303. Further, the plurality of protrusions 304*b* are arranged throughout the sliding member 304, however, in a case that the sliding member 304 is larger than the nip portion N, the plurality of protrusions 304*b* may be configured to be arranged only in the nip portion N.

[Relationship Between the Base Material Layer and the Sliding Layer of the Sliding Member]

As described above, the sliding member 304 is covered with the sliding layer 304*c* on the surface of a side of the base material layer 304*a* in which the plurality of protrusions 304*b* are formed. Here, details of the sliding layer 304*c* of the sliding member 304 when the fixing device 8 is driven will be described. As shown in FIG. 4, when the fixing device 8 is driven, the belt 301 moves relative to the sliding member 304 in a direction D in the figure, and thereby force FD is generated on the sliding layer 304*c* in the conveying direction.

By using the comparative example 1 which is shown in part (a) and part (b) of FIG. 5, an effect of the force FD in the conveying direction which acts on the sliding layer 304*c* on the sliding layer 304*c* and an effect of surface properties of the base material layer 304*a* on the sliding layer 304*c* at that time will be described. In part (a) of FIG. 5, a relationship between forces which are generated on the sliding layer 304*c* of one protrusion 304*b* is simplified and shown. The force FD in the conveying direction from the base layer 301*a* of the belt 301 acts on the sliding layer 304*c*. Further, the sliding layer 304*c* is adhered to the base material layer 304*a* which includes the plurality of protrusions 304*b*, and force $F_A$ which counteracts the FD is applied from an adhesive portion.

Here, when the FD becomes great relative to adhesive strength between the base material layer 304*a* and the sliding layer 304*c*, the sliding layer 304*c* is peeled off from the protrusion 304*b* of the base material layer 304*a* as shown in part (b) of FIG. 5. And the leading end surface 304*d*1 of the protrusion 304*b* is exposed and the protrusion 304*b* contacts the base layer 301*a* of the belt 301. This may increase the frictional force between the belt 301 and the sliding member 304, which may increase the drive torque of the belt 301 and cause image defects due to uneven height of the protrusion 304*b*.

The $F_A$ which acts between the base material layer 304*a* and the sliding layer 304*c* depends on the adhesive strength between the base material layer 304*a* and the sliding layer 304*c*, and the greater the adhesive strength, the greater the $F_A$. It is known that the adhesive strength is sensitive to the surface properties of the base material layer 304*a*. This point will be discussed below.

Next, by using the comparative example 2 which is shown in part (a) and part (b) of FIG. 6, an effect of the surface properties of the base material layer 304*a* when the sliding layer 304*c* is worn will be described. Part (a) of FIG. 6 shows a state of one protrusion 304*b* when the surface roughness of a surface 304*d* of the base material layer 304*a* which includes the leading end surface 304*d*1 of the protrusion 304*b* is rough. When the surface 304*d* of the base material layer 304*a* is rough, the adhesive strength increases as adhesive area between the base material layer 304*a* and the sliding layer 304*c* is increased.

In part (b) of FIG. 6, a state, when the sliding layer 304*c* wears as the fixing device 8 is used, is shown. As thickness of the sliding layer 304*c* decreases due to wear, the leading end surface 394*d*1 of the protrusion 304*b* is exposed and contacts with the base layer 301*a* of the belt 301. At this time, when a surface of the leading end surface 304*d*1 of the protrusion 304*b* is rough, the protrusion 304*b* damages the base layer 301*a* in a case of a configuration in which hardness of the protrusion 304*b* is equal to or harder than hardness of the base layer 301*a* of the belt 301.

Therefore, a decrease in a lifetime of the belt 301, an image defect and an increase in driving torque due to staying of abrasive powder in the nip portion N when the abrasive powder is generated by abrading the inner surface of the base layer 301*a* of the belt 301 may occur. A relationship between protrusion 304*b* and damage to the base layer 301*a* of belt 301 will be also described below.

In this way, in a case that the surface roughness of the base material layer 304*a* which includes the plurality of protrusions 304*b* is small, the adhesive strength between the base material layer 304*a* and the sliding layer 304*c* is decreased, and in a case that the surface roughness of the base material layer 304*a* is large, the inner peripheral surface of the belt 301 is easily damaged when the sliding layer 304*c* is worn and the base material layer 304*a* is exposed. Therefore, in the embodiment, the surface roughness of the surface 304*d* of the base material layer 304*a* which includes the plurality of protrusions 304*b* is set within an appropriate range, as will be described below.

[Surface Roughness of the Base Material Layer]

The surface roughness of the base material layer 304*a* in the sliding member 304 according to the embodiment will be described by using part (a) and part (b) of FIG. 7. In part (a) and part (b) of FIG. 7, a case, in which the surface roughness of the base material layer 304*a* which includes the plurality of protrusions 304*b* is adequate, is shown. That is, in the embodiment, an arithmetic mean of roughness Ra of the leading end surface 304*d*1 of the plurality of protrusions 304*b* satisfies $0.13\ \mu m \leq Ra \leq 1.67\ \mu m$. In this way, as shown in part (a) of FIG. 7, the adhesive strength between the leading end surface 304*d*1 of the plurality of protrusions 304*b* and the sliding layer 304*c* are secured. Along with this, as shown in part (b) of FIG. 7, even when the sliding member 304 is worn and the leading end surface 304*d*1 of the protrusion 304*b* is exposed, it is possible to suppress damage to the inner peripheral surface of the belt 301.

Further, in the embodiment, the arithmetic mean of roughness Ra of a side surface 304*d*2 of the plurality of protrusions 304*b* satisfies $0.13\ \mu m \leq Ra \leq 1.67\ \mu m$. In this way, when the surface roughness of the side surface 304*d*2 in addition to the leading end surface 304*d*1 of the protrusion 304*b* is appropriate, it is possible to further increase the adhesive strength between the base material layer 304*a* and the sliding layer 304*c*. Further, even when the side surface 304*d*2 is exposed and contacts the inner peripheral surface of the belt 301, it is possible to suppress the damage to the inner peripheral surface of the belt 301.

Furthermore, in the embodiment, for a bottom surface 304*d*3 of a recessed portion 304*f* between the plurality of adjacent protrusions 304*b* in the surface 304*d* on a side in which the sliding layer 304*c* of the base material layer 304*a* is provided, the arithmetic mean of roughness Ra of the side surface 304*d*2 of the plurality of protrusions 304*b* also satisfies $0.13\ \mu m \leq Ra \leq 1.67\ \mu m$. That is, in the embodiment, for the entire surface 304*d* of the base material layer 304*a*, the arithmetic mean of roughness Ra satisfies $0.13\ \mu m \leq Ra \leq 1.67\ \mu m$. In this way, when the surface roughness of the bottom surface 304*d*3 in addition to the leading end surface 304*d*1 of the protrusion 304*b* and the side surface 304*d*2 is appropriate, it is possible to further increase the adhesive strength between the base material layer 304*a* and the sliding layer 304*c*. Further, even when the side surface 304*d*3 is exposed and contacts the inner peripheral surface of the belt 301, it is possible to suppress the damage to the inner peripheral surface of the belt 301.

Incidentally, in the embodiment, by applying surface treatment to the base material layer 304*a*, the base material layer 304*a* achieves a predetermined surface roughness. In this case, as described above, when the leading end surface 304*d*1 of the protrusion 304*b*, the side surface 304*d*2 and the bottom surface 304*d*3 of the recessed portion 304*f* are same range of surface roughness, it is possible to perform the surface treatment.

[Study Experiment]

Next, the study experiment which is conducted to confirm effectiveness of the embodiment. For the study experiment, a plurality of sliding members from A through E are prepared, in which the surface roughness of the surface 304*d* of the base material layer 304*a* is distributed in multiple levels. And these sliding members from A through E are sequentially replaced in the fixing device 8, and a driving endurance test is conducted. The driving endurance test is conducted in a mode in which a state that the pressing roller 305 contacts the belt 301 and a state that the pressing roller 305 does not contact the belt 301 are repeated by turn. A target design time in this mode is 240 hours. In a case that the driving torque (the driving torque (initial torque) of the driving motor which drives the pressing roller 305) exceeded a preset upper limit value within the target design time, the driving endurance test is terminated, and the sliding member is removed from the fixing device 8 and a condition of the sliding layer 304*c* of the sliding member is observed. In a case that the driving torque does not exceed the upper limit value within the target design time, the driving endurance test is terminated after an elapse of the target design time, and the sliding member is removed from the fixing device 8 and a condition of the sliding layer 304*c* of the sliding member is observed.

In this study, the base material layers 304*a* of the sliding members from A through E, whose surface properties are changed by various treatments, are used. The surface roughness is measured at a cutoff frequency of 0.08 mm by using a surface roughness measuring instrument, and a measuring location is an end portion of the base material layer 304*a* of the sliding member in which the protrusion 304*b* does not exist. Values of the surface roughness Ra of samples which are used in this study are 0.04 μm (sliding member A), 0.13 μm (sliding member B), 0.52 μm (sliding member C), 1.67 μm (sliding member D) and 2.09 μm (sliding member E), respectively. After measuring the surface roughness, by providing the sliding layer 304*c* with the base material layer 304*a* of each of the sliding members from A through E, the sliding members are completed.

Next, the results of the study experiment will be described by using the table in FIG. 8. As shown in the table in FIG. 8, when the surface roughness Ra of the surface 304*d* of the base material layer 304*a* is 0.04 μm or less, the driving torque exceeds a threshold value within the target endurance design time. Further, when the sliding member is removed and checked, it is observed that the sliding layer 304*c* is peeled off from the base material layer 304*a* in numerous locations and it is found that the adhesive strength is insufficient. Further, the abrasive powder of the belt 301 which exists is small amount, and it is estimated that an increase in driving torque is due to increased frictional force which is caused by contacting the base material layer 304*a* with the base layer 301*a* of the belt 301.

When the surface roughness Ra of the surface 304*d* of the base material layer 304*a* is 0.13 μm or more, it is found that the adhesive strength is secured during the target durability design time. Further, when the surface roughness Ra of the surface 304*d* of the base material layer 304*a* is 2.09 μm or more, the driving torque exceeds the threshold value within the endurance time. When the sliding member is removed and checked, it is observed that a large amount of the abrasive powder of the base layer 301*a* of the belt 301 is attached. Thus, when the surface roughness Ra of the surface 304*d* of the base material layer 304*a* satisfies 0.13 μm≤Ra≤1.67 μm, it is confirmed that it is possible to suppress the increase in driving torque due to the damage to the inner peripheral surface of the belt 301, while the adhesive strength is secured.

Incidentally, it is more preferable that the surface roughness Ra of the surface 304*d* of the base material layer 304*a* satisfies 0.13 μm≤Ra≤1.67 μm. In the experiment which is described above, in a case that the surface roughness Ra is 0.13 μm, the best results are obtained.

Part (a), part (b) and part (c) of FIG. 10 show changes over time of the sliding layer 304*c* when an image forming operation is continued for a long time while the base layer 301*a* of the belt 301 slides on the sliding layer 304*c*. The sliding layer 304*c* of one protrusion 304*b* is used from a state that film thickness is large as shown in part (a) of FIG. 10, however, as the image forming operation of the image forming apparatus progresses, the sliding layer 304*c* gradually wears, and the film thickness of the sliding layer 304*c* at the leading end portion of the protrusion 304*b* decreases as shown in part (b) of FIG. 10. As the image forming operation of the image forming apparatus progresses further, when the leading end surface 304*d* (base material layer 304*a*) of the protrusion 304*b* is exposed, as shown in part (c) of FIG. 10, the base material layer 304*a* which has a larger friction coefficient than the sliding layer 304*c* directly contacts with the base layer 301*a* of the belt 301. As a result, a driving torque may be increased due to increased frictional force between the belt 301 and the sliding member 304 and an image defect due to uneven height of the protrusion 304*b* may be occurred. At this point, the fixing device 8 reaches an end of lifetime, so it is required that the thickness of the sliding layer 304*c* is above a certain level.

[Regarding Thickness of the Sliding Layer of the Protrusion]

Next, thickness Tbc of the sliding layer 304*c* in the protrusion 304*b* of the sliding member 304 (hereinafter referred to as "protrusion sliding layer thickness Tbc") will be described by using from part (a) through part (d) of FIG. 11. Part (a) of FIG. 11 is an enlarged sectional view of one arbitrary protrusion 304*b* among the plurality of the protrusions 304*b* on the sliding member 304, and is shown upside down from part (a) of FIG. 3, FIG. 4, and parts (a) to (c) of FIG. 10 and the protrusion 304*b* is up. Further, part (b) of FIG. 11 shows a schematic diagram after removing the sliding layer 304*c* at the leading end of protrusion 304*b* by using a metal blade, etc. The protrusion sliding layer thickness Tbc is defined as difference between a height of the sliding layer 304*c* (in the Z direction) before the sliding layer 304*c* is removed and a height of the protrusion 304*b* (in the Z direction), as shown in part (c) of FIG. 11. That is, the protrusion sliding layer thickness Tbc is a height from the leading end surface 304*d* of the protrusion 304*b* to a highest position of the sliding layer 304*c* in the Z direction.

As an example of an actual measurement, there is a measurement method to calculate from difference of height profiles in a two-dimensional direction which is measured at a set magnification of 40× by using a VR-3200 threedimensional shape coordinate measuring machine which is manufactured by Keyence. Further, the width Wbc of the leading end surface of the protrusion is defined as below. The width Wbc of the leading end surface of the protrusion is calculated from the height profile in a short side direction, when the leading end surface 304*d* (head top portion) of the protrusion 304*b* is approximated by a rectangle, passing through a maximum height position of the protrusion 304*b* to be measured, as shown in part (d) of FIG. 11. That is, the width Wbc of the leading end surface 304*d* of the protrusion 304*b* is the length in the short side direction, when a shape of the leading end surface 304*d* of the protrusion 304*b* is approximated by the rectangle. In part (d) of FIG. 11, the width Wbc of the leading end surface 304*d* of the protrusion 304*b* in a case that the shape of the leading end surface of the protrusion 304*b* is various shapes such as round or oval.

Here, the sliding layer 304*c* is formed by firing at a high temperature after spraying a coating agent such as fluorocarbon resin (PTFE, PFA, etc.) which is dispersed in water or an organic solvent onto a surface on a side of the base material layer 304*a* which slides on the belt 301, that is, a surface on which the protrusion 304*b* is formed. In the embodiment, viscosity of the coating agent during spraying (when it is liquid) is 10 Pa·sec or less at room temperature (25° C.). Since the sliding layer 304*c* has low viscosity of a few Pa·sec when it is sprayed at room temperature and the viscosity is further decreased during high temperature firing, when the sliding layer 304*c* is formed on the protrusion 304*b*, the coating agent which serves as the sliding layer flows out from a leading end surface 304*d* (head top portion) to a valley portion. The narrower the width Wbc of the leading end surface 304*d* of the protrusion 304*b*, the more likely this outflow of the coating agent is to occur. Therefore, the smaller the width Wbc of the leading end surface 304*d* of the protrusion 304*b*, the smaller the thickness Tbc of the protrusion sliding layer.

In part (a) of FIG. 12, in a case that the shape of the leading end surface 304*d* of the protrusion 304*b* of the sliding member 304 is changed a plurality of times, measurement results of the protrusion sliding layer thickness Tbc and the width Wbc of the leading end surface 304*d* of the protrusion 304*b* of the sliding member 304 are shown. This result shows that the width Wbc of the leading end surface 304*d* of the protrusion 304*b* needs to be 100 μm or more to obtain the protrusion sliding layer thickness Tbc.

On the other hand, when the width Wbc of the leading end surface 304*d* of the protrusion 304*b* is too large, it leads to an increase in the width of the protrusion 304*b*, which is provided in order to reduce the driving torque of the fixing device 8 that is an original purpose. For example, it is required that the initial torque of the driving motor which is applied in the fixing device 8 according to the embodiment is suppressed at 200 mNm or less. In part (b) of FIG. 12, a result in which a relationship between the width Wbc of the leading end surface 304*d* of the protrusion 304*b* and the driving torque (initial torque) of the driving motor which drives the pressing roller 305 is examined is shown.

In part (b) of FIG. 12, the sliding layer 304*c* is formed by changing the shape of the leading end surface 304*d* of the protrusion 304*b* a plurality of times, and each of them is actually assembled in the fixing device 8 and the driving torque of the driving motor is measured. As shown in the result in part (b) of FIG. 12, it is preferable that the width Wbc of the leading end surface 304*d* of the protrusion 304*b* is 150 μm or more and 450 μm or less, in order to suppress the driving torque at 200 mNm or less. Incidentally, it is not possible to measure the driving torque in part (b) of FIG. 12 when the width Wbc is 100 μm or less, because the sliding layer is not formed on the head top portion of the protrusion 304*b*, as described in part (a) of FIG. 12.

[Study Experiment]

Next, the study experiment which is conducted to confirm effectiveness of the embodiment. For the study experiment, a plurality of sliding members from A through H are prepared, in which the width Wbc of the leading end surface 304*d* of the protrusion 304*b* is distributed in multiple levels and the sliding layer 304*c* is formed under a same processing condition. Incidentally, for the sliding members from A through F, a distance (space) d between centers of adjacent protrusions 304*b* is 1.4 mm, and for the sliding members G and H, the distance d is 1.8 mm. And these sliding members from A through G are sequentially replaced in the fixing device 8, and a driving endurance test is conducted. The driving endurance test is conducted in a mode in which a state that the pressing roller 305 contacts the belt 301 and a state that the pressing roller 305 does not contact the belt 301 are repeated by turn. A target design time in this mode is 240 hours. In a case that the driving torque exceeded a preset upper limit value within the target design time, the driving endurance test is terminated, and in a case that the driving torque does not exceed the upper limit value within the target design time, the driving endurance test is terminated after an elapse of the target design time.

Next, the results of the study experiment will be described by using the table in FIG. 13. As shown in the table in FIG. 13, results for the sliding members from A through F are the results of the driving endurance test in a case that the width Wbc of the leading end surface 304*d* of the protrusion 304*b* is increased by every 50 μm. It is found that when the protrusion sliding layer thickness Tbc is formed to be 8 μm or more, the initial driving torque is a specified value or less. Further, in the sliding members E and F, the contact area between the sliding layer 304*c* and the base layer 301*a* of the belt 301 is increased due to an increase in film thickness and the driving torque exceeds a predetermined value, however, as in the sliding members G and H, it is possible to suppress the driving torque below the predetermined value by increasing the distance d between the protrusions 304*b* to 1.8 mm and reducing density of the protrusion 304*b*.

From the above, it is preferable that the width Wbc of the leading end surface 304*d* of the protrusion 304*b* is 150 μm or more in terms of the initial driving torque. Further, it is desirable that the width Wbc is 200 μm or more to meet the driving torque at an end of an endurance period. Furthermore, it is preferable that the distance d between the protrusions 304*b* is 1.4 mm or more, and when the distance d is less than 1.8 mm, it is preferable that the width Wbc is 500 μm or less and it is more preferably that it is 450 μm or less, in terms of the driving torque. In a case that the distance d is 1.8 mm or more, the width Wbc may be greater than 500 μm, however, it is preferable that the width Wbc is 550 μm or less. In any case, regardless of size of the distance d, the width Wbc is 150 μm or more.

[Another Example of the Embodiment]

Incidentally, in the embodiment which is described above, a configuration in which the sliding layer 304*c* is provided directly on the base material layer 304*a* is described, however, as shown in FIG. 9, an adhesive layer 304*e* may be provided between the base material layer 304*a* and the sliding layer 304*c*. That is, the adhesive layer 304*e* which adheres to the base material layer 304*a* and the sliding layer 304*c* may be configured to be provided between the base material layer 304*a* which includes the plurality of protrusions 304*b* and the sliding layer 304*c*. By using the adhesive layer 304*e*, it is possible to develop good adhesive strength between the base material layer 304*a* and the sliding layer 304*c* when the base material layer 304*a* is made of metallic material such as stainless steel, copper or aluminum.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2022-028922 filed on Feb. 28, 2022 and 2022-028924 filed on Feb. 28, 2022 which are hereby incorporated by reference herein in its entirety.

What is claimed is:

1. A fixing device comprising:

an endless belt configured to apply heat to a recording material;

a rotatable pressing member contacting an outer circumferential surface of the belt;

a pad member inside of the belt, configured to form a nip portion by nipping and feeding the belt between itself and the rotatable pressing member; and a sliding member held by the pad member and configured to slide on an inner circumferential surface of the belt in the nip portion, wherein the rotatable pressing member nips and feeds the recording material in the nip portion in cooperation with the belt and fixes a toner image on the recording material by applying heat and pressure, wherein the sliding member includes a base material layer on which a plurality of projections projecting toward the rotatable pressing member are formed on a side sliding with the belt and a sliding layer provided on an outer surface of the plurality of projections, and wherein a leading end of the plurality of projections is a plane and an average roughness (Ra) of the plane satisfies 0.13 μm≤Ra≤1.67 μm.

2. The fixing device according to claim 1, wherein an average roughness Ra of a side surface of the plurality of projects satisfies 0.13 μm≤Ra≤1.67 μm.

3. The fixing device according to claim 2, wherein in a surface of a side of the basic material layer on which the sliding layer is provided, an average roughness Ra of a bottom surface of a recessed portion between the plurality of adjacent projections satisfies 0.13 μm≤Ra≤1.67 μm.

4. The fixing device according to claim 1, wherein between the basic material layer and the sliding layer, an adhesive layer adhering the sliding layer to the basic material layer is provided.

5. The fixing device according to claim 1, wherein a width Wbc of the plane is 150 μm to 450 μm.

6. The fixing device according to claim 1, wherein the plurality of projections are disposed over in a feeding direction of the recording material in the nip portion and over a widthwise direction of the recording material crossing the feeding direction in a plurality, respectively, and a distance between centers of adjacent projections in the feeding direction and a distance between centers of adjacent projections in the widthwise direction are not less than 1.4 mm, respectively.

7. The fixing device according to claim 1, wherein the sliding layer is formed by baking at a high temperature after spray coating of a coating agent to a surface of a side of the basic material layer which slides on the belt, and wherein a viscosity of the coating agent during spray is not more than 10 Pa·sec at a normal temperature.

8. The fixing device according to claim 1, wherein the basic material layer is made of a metal, and wherein the sliding layer is made of a resin.

9. The fixing device according to claim 8, wherein the sliding layer is made of a fluororesin.

10. The fixing device according to claim 1, wherein a fixing operation continues in a state in which the plane slides on the inner circumference of the belt.

* * * * *